(12) United States Patent
Reister

(10) Patent No.: US 7,395,359 B2
(45) Date of Patent: Jul. 1, 2008

(54) AUTOMATIC CONFIGURATION OF NETWORK COMPONENTS HAVING SEPARATE UNPROGRAMMED NETWORK DEVICES CONFIGURED TO COMMUNICATE WITH SEPARATE INTERCONNECTED NETWORK TERMINALS

(75) Inventor: Klaus Reister, Dettingen (DE)

(73) Assignee: Hirschmann Electronics GmbH & Co. KG, Neckartenzlingen (DE)

( * ) Notice: Subject to any disclaimer, the term of this patent is extended or adjusted under 35 U.S.C. 154(b) by 0 days.

(21) Appl. No.: 10/451,111

(22) PCT Filed: Dec. 20, 2001

(86) PCT No.: PCT/EP01/15161

§ 371 (c)(1),
(2), (4) Date: Oct. 14, 2003

(87) PCT Pub. No.: WO02/052791

PCT Pub. Date: Jul. 4, 2002

(65) Prior Publication Data

US 2004/0117463 A1     Jun. 17, 2004

(30) Foreign Application Priority Data

Dec. 23, 2000   (DE) ................ 100 65 158

(51) Int. Cl.
*G06F 15/177*   (2006.01)
*G06F 13/00*    (2006.01)

(52) U.S. Cl. .............. 710/8; 710/9; 710/10; 710/11; 710/13; 710/62; 710/72; 713/162; 713/201; 709/220

(58) Field of Classification Search ........... 710/8–11, 710/13, 62, 72; 713/162, 201; 709/220
See application file for complete search history.

(56) References Cited

U.S. PATENT DOCUMENTS

| | | | |
|---|---|---|---|
| 5,638,497 A | | 6/1997 | Kimber et al. |
| 5,903,716 A | | 5/1999 | Kimber et al. |
| 6,039,430 A | * | 3/2000 | Helterline et al. ............. 347/19 |
| 6,055,227 A | | 4/2000 | Lennert et al. |
| 6,108,437 A | * | 8/2000 | Lin ............................ 382/118 |
| 6,263,387 B1 | * | 7/2001 | Chrabaszcz ................. 710/302 |
| 6,782,474 B1 | * | 8/2004 | Ylonen ....................... 713/162 |

FOREIGN PATENT DOCUMENTS

| | | |
|---|---|---|
| EP | 0 959 587 | 11/1999 |
| FR | 2 783 660 | 3/2000 |
| WO | WO 9601456 | 1/1996 |

\* cited by examiner

*Primary Examiner*—Tammara Peyton

(57) ABSTRACT

The present invention relates to a method and apparatus for providing configuration information to terminals and network components within a network. In particular, a specialist is no longer necessary in order to exchange a terminal or a component for the network. The network user simply exchanges the terminal or the network component and places a configuration storage adapter in a serial interface of the replaced terminal or component, whereby the newly inserted terminal or network component is automatically provided with stored configuration information and the network can then be started.

17 Claims, 1 Drawing Sheet

AUTOMATIC CONFIGURATION OF NETWORK COMPONENTS HAVING SEPARATE UNPROGRAMMED NETWORK DEVICES CONFIGURED TO COMMUNICATE WITH SEPARATE INTERCONNECTED NETWORK TERMINALS

BACKGROUND OF THE INVENTION

1. Field of the Invention

The present invention relates to a process and an apparatus for providing configuration information to a replaced terminal and/or a replaced network component for a network to transmit electronic data, and more particularly to a process and an apparatus for storing network configuration information in storage adapters that can be connected to replaced network terminals or network components.

2. Description of the Related Technology

It is generally known that a network of terminals (network-able devices such as, for example, Personal Computers (PCs), input or output devices, such as sensors or actuators, or the like) exchanges data via network components (such as, for example, an Ethernet switch). In order to set up such networks, the terminals and also the network components must be configured with operating parameters for intercommunications before data exchange via the network and regular operation are possible. The input configuration operating parameters are dependent on the type of network to be configured and can be simple or complex; such setup of a network can be carried out manually or be partially automated, and, accordingly, the extent of set up imposes different requirements as to operator qualifications.

One important requirement found mainly in control operations and automation technology is the need for rapid replacement of failed terminals or network components in order to keep expensive downtimes of such network systems as short as possible. Replaced terminals or components must be configured in the same way as the failed terminals or components before being started-up in order to be able to undertake effective operation after replacement. Thus, the configuration of communications parameters for field bus-capable devices is limited simply to setting a few switches; this extent of setup can be carried out by less qualified personnel.

Recently network standards which were actually developed for the area of office communications (such as, for example, Ethernet, local bridges according to IEE802.1 and the Transmission Control Protocol/Internet Protocol (TCP/IP) protocol family) have been increasingly used for control and automation tasks. The configuration of the communications and operating parameters for terminals and network components for these types of network environments is much more complex and extensive than that encountered with field busses. This level of complexity may be acceptable within office communication systems since qualified personnel normally are available and downtimes are less critical. Extensive configuration setups however can not be accepted in the area of control and automation technology since in the case of these types of networks downtimes are cost-intensive and in general qualified personnel are not available.

SUMMARY OF THE INVENTION

An object of the invention is to provide a process and an apparatus for configuration set up of terminals and components connected into networks so as to avoid the above described disadvantages.

The present invention provides a process in which the operating configuration parameters of at least one terminal/network component are first stored and when the terminal/component is replaced, the stored operating configuration parameters are transmitted to the replacement terminal/replacement component. Thus the replaced terminal or network component is made to be essentially a plug-and-playable situation without additional cost, in particular without a requirement for the aid of qualified personnel to input configuration parameters for the network when the original configuration for the replaced terminal or the replaced network component is set. Thus it becomes possible after start-up of the network, when appropriately trained personnel are no longer available or when time is of the essence, to transmit initially entered operating configuration parameters to replacement terminals or components used to address a fault case. The initial configuration parameters therefore are entered by qualified personnel when the system is started up, i.e. all necessary information about the communications and operating parameters for the network components and terminals are stored according to the present invention. Afterwards these operating parameters can be transmitted by straight forward and simple manual intervention to the replacement terminals or replacement components.

As an aspect of the invention, the storage of operating configuration parameters takes place using a storage adapter which can be connected to a replaced terminal/network component to deliver at least one distinct identification character for installing configuration parameters to the replacement terminal/replacement component. If within the topology of the network a terminal or network component is to be replaced (for example, due to a defect) the previously installed configuration parameters are available because they are initially stored in the storage adapter during error-free operation of the network or upon start-up of the network. After there has been a replacement of a terminal device/network component the previously stored operating configuration parameters readily can be transmitted by connecting the storage adapter to an interface of the replacement terminal device or the replacement component so that the replacement terminal device/replacement component is immediately and easily initialized for use. Thus, for example, not only the configuration parameters stored originally at the factory or by the manufacturer, but also altered configuration parameters, which often are necessary in complex networks and often deviate from factory settings, are preserved.

As another aspect of the invention, it is provided that the storage adapter, especially a serial adapter without its own power supply, is plugged into an interface, especially into a serial interface, of the originally installed terminal device/component or the replacement terminal device/replacement component. In this way fast and uncomplicated data transmission is easily possible in order to transmit configuration parameters, which have been stored in the adapter, to the replacement terminal device/replacement component. The entire configuration, such as especially the operating and communications parameters of the terminal devices or components for the network are stored in a storage adapter, such as an Electronically Erasable/Programmable Read-Only Memory (EEPROM), of the adapter.

As a further aspect of the invention, an installed storage adapter obtains its power supply from the terminal or from the network component to which it is connected. In this way the adapter is ready to operate at any time and can be used over a long time interval during network operation.

BRIEF DESCRIPTION OF THE DRAWINGS

An embodiment for a process and a network apparatus (sample device) according to the present invention is described below using the shown FIGURE.

DETAILED DESCRIPTION

Figure 1:
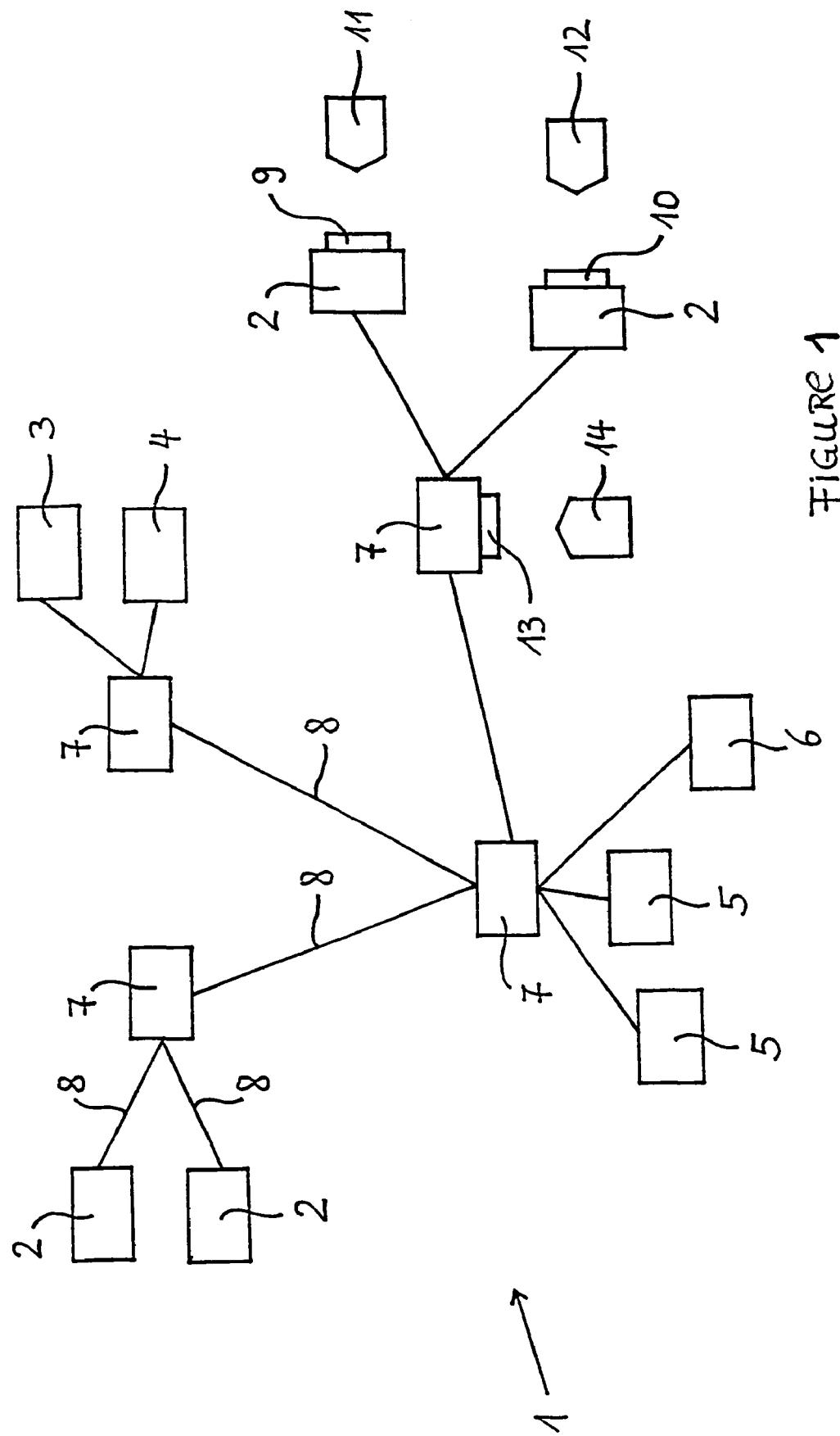
FIG. 1 shows a block diagram according to an embodiment for the present invention.

FIG. 1 shows a block diagram for a network 1 according to the present invention, which has one or more terminals 2 (for example, PCs) in any number that are installed at various locations. The term terminal as used here also includes input units 3, output units 4, sensors 5 and actuators 6 and other comparable corresponding devices. The number and locations for these terminals depend on the topology of the network as may be dictated by application. For example, possible applications include control of process-engineering systems and other applications in control and automation technology, and also office communications. These references to applications do not constitute any limitation for the scope of appropriate applications for this invention.

Terminal numbers 2 to 6 are connected either individually or in groups to network components 7. Data are exchanged between the respective terminals and the pertinent network components 7, depending on the type and location of terminals, via a data line 8, and within the network 1; the same or different data lines 8 can be used.

For example, two terminals 2 (or only one terminal or more than two or all terminals of the network 1) have one interface 9 or 10 at a time, which are especially serial interfaces. Reference numbers 11 and 12 are used to identify storage adapters 11 and 12 located with respective terminals 2. Different adapters for several terminals also can be used. Depending on the complexity of the network and the type of terminal, there also can be one adapter for each terminal. These adapters are in turn the same or different in design. The same situation also applies to the adapters assigned to the network components. This circumstance arises because at least one network component 7 (or alternatively all network components) has (have) one (especially serial) interface 13 with a pertinent adapter 14. When the network 1 is started up, the set up configuration of the terminals and the pertinent network components is stored in the adapters 11 and 12 (also there can be more or fewer adapters). If it later is determined that one terminal 2, for example, due to a defect or updating (or a network component 7) must be replaced, replacement easily can take place. After the replacement the pertinent adapter is connected to the new terminal or new network component and thus the pertinent configuration is set into the terminal or component. This configuration setup takes place during the network restart BOOT process. The plugged-in adapter having previously had stored in its storage device (especially an EEPROM) a distinct identification character with which the required selected configuration can be retrieved by reference to a suitable protocol from a server or the entire required configuration can be loaded from the adapter. The adapter receives its supply of power from the pertinent terminal or network component which can be, for example, an Ethernet switch.

Accordingly, a process and an apparatus for configuration control of the terminals and network components within a network are made available when replacement of one or more terminal or component is necessary. Field implementation of the present invention does not require a specialist. A minimally trained operator simply replaces one terminal or one network component and plugs a configuration storage adapter into the serial interface of the newly inserted terminal or network component so that it is automatically supplied with the stored configuration information and the network can then be started.

The invention claimed is:

1. A method for a setting-up a network apparatus having a network including at least two interconnected network terminals, said network further including separate programmed network devices connected to separate interconnected network terminals, operation of said network being controlled by network configuration parameter information, the network interconnected programmed network devices can operate independently or the network interconnected programmed network devices can communicate with each other, the method comprising:
   storing the network configuration parameter information in a storage adapter;
   connecting an unprogrammed network device to one of said network terminals;
   connecting said adapter as a direct connection without interconnection through the network to an interface that is connected to said unprogrammed network device; and
   inputting the stored network configuration parameter information from said storage adapter through said interface without communication through said network into said unprogrammed network device to configure said unprogrammed network device into a programmed network device that operates using said network.

2. The method according to claim 1 wherein said unprogrammed network device is a terminal device.

3. The method according to claim 2 wherein said terminal device is a personal computer.

4. The method according to claim 1 wherein said unprogrammed network device is a network component.

5. The method according to claim 4 wherein said network component is an Ethernet switch.

6. The method according to claim 1 further comprising inputting network configuration parameter information to said unprogrammed network device by having said storage adapter output an identification character in both said unprogrammed network device and said network.

7. The method according to claim 6 further comprising downloading configuration operating parameters to said unprogrammed network device from a server when said server receives the identification character output from said storage adapter.

8. The method according to claim 1 wherein said storage device receives power from said unprogrammed network device.

9. A network apparatus having a network including at least two interconnected terminals, said network further including separate programmed network devices connected to separate interconnected terminals, operation of said network, including communication of data between separate interconnected programmed network devices being controlled by network configuration parameter information, the network apparatus comprising:
   a storage adapter having stored network configuration parameter information for said network;
   an unprogrammed network device connected to a terminal of said network; and
   said storage adapter being directly connected without interconnection through the network to an interface that is connected to said unprogrammed network device;
   wherein the network configuration parameter information stored in said adapter is input from said adapter through said interface without communication through said network into said unprogrammed network device to configure said new unprogrammed network device into a programmed network device with operating parameters for said network apparatus.

10. The apparatus according to claim 9 wherein said unprogrammed network device is a terminal device.

11. The apparatus according to claim 10 wherein said terminal device is a personal computer.

12. The apparatus according to claim 9 wherein said unprogrammed network device is a network component.

13. The apparatus according to claim 12 wherein said network component is an Ethernet switch.

14. The apparatus according to claim 9 wherein said storage device outputs an identification character into both said unprogrammed network device and said network.

15. The apparatus according to claim 14 further comprising:

a server connected to said network, and network operating parameters also stored on said server such that when said server receives the identification character output from said storage adapter the network operating parameters stored on said server are downloaded to said unprogrammed network device.

16. The apparatus according to claim 9 further comprising:

said unprogrammed network device connected to said storage adapter to provide power to said storage adapter.

17. The apparatus according to claim 9 wherein said storage adapter is an EEPROM.

* * * * *